(12) United States Patent
Iwasa et al.

(10) Patent No.: US 8,157,681 B2
(45) Date of Patent: Apr. 17, 2012

(54) CONTROL DEVICE AND CONTROL METHOD FOR CONTINUOUSLY VARIABLE TRANSMISSION

(75) Inventors: Hiroki Iwasa, Machida (JP); Yoshihisa Kodama, Sagamihara (JP)

(73) Assignee: Jatco Ltd, Fuji-shi (JP)

( * ) Notice: Subject to any disclaimer, the term of this patent is extended or adjusted under 35 U.S.C. 154(b) by 411 days.

(21) Appl. No.: 11/942,100

(22) Filed: Nov. 19, 2007

(65) Prior Publication Data
US 2008/0119308 A1    May 22, 2008

(30) Foreign Application Priority Data
Nov. 21, 2006    (JP) .................... 2006-314092

(51) Int. Cl.
*F16H 63/00* (2006.01)
(52) U.S. Cl. ........................................ 474/28
(58) Field of Classification Search .......... 474/70, 474/28, 8, 17–18; 477/44, 46, 109, 110
See application file for complete search history.

(56) References Cited

U.S. PATENT DOCUMENTS

| | | | |
|---|---|---|---|
| 4,829,433 A | 5/1989 | Nakano et al. | |
| 5,624,349 A | 4/1997 | Yamamoto et al. | |
| 5,971,876 A * | 10/1999 | Spiess et al. | 474/28 |
| 6,080,080 A | 6/2000 | Bolz et al. | |
| 6,379,282 B1 * | 4/2002 | Aoki | 477/109 |
| 6,478,712 B1 * | 11/2002 | Kawamura et al. | 477/37 |
| 6,569,044 B1 * | 5/2003 | Sen et al. | 474/28 |
| 7,192,371 B2 | 3/2007 | Yamamoto et al. | |
| 2001/0046912 A1 * | 11/2001 | Inamura | 474/28 |
| 2004/0116244 A1 | 6/2004 | Yamamoto et al. | |
| 2004/0171444 A1 * | 9/2004 | Yamamoto et al. | 474/28 |
| 2005/0221929 A1 * | 10/2005 | Oshita et al. | 474/28 |

FOREIGN PATENT DOCUMENTS

| | | |
|---|---|---|
| DE | 197 43 058 A1 | 4/1999 |
| DE | 103 45 763 A1 | 4/2004 |
| EP | 0 274 080 A2 | 7/1988 |
| EP | 1 215 419 A2 | 6/2002 |
| EP | 1 400 728 A2 | 3/2004 |
| JP | 8-178063 A | 7/1996 |
| JP | 8-210450 A | 8/1996 |
| JP | 8-312741 A | 11/1996 |
| JP | 2002-181180 A | 6/2002 |
| JP | 2004-125037 A | 4/2004 |

* cited by examiner

*Primary Examiner* — Robert Siconolfi
*Assistant Examiner* — Anna Momper
(74) *Attorney, Agent, or Firm* — Foley & Lardner LLP

(57) ABSTRACT

When a speed ratio (ip) at a stopping time of the vehicle cannot be stored, an operating position of a step motor (27) is initialized to a home position such that a primary pulley pressure (Ppri) is completely drained, a secondary pulley pressure (Psec) is increased to a predetermined pressure (P1), and a pulley ratio (the speed ratio (ip)) between a non-rotating primary pulley (2) and a non-rotating secondary pulley (3) is set at a lowest speed ratio. As a result, the primary pulley pressure (Ppri) is supplied reliably, and the startability of the vehicle improves.

6 Claims, 4 Drawing Sheets

CONTROL DEVICE AND CONTROL METHOD FOR CONTINUOUSLY VARIABLE TRANSMISSION

FIELD OF THE INVENTION

This invention relates to a control device and control method for a continuously variable transmission.

BACKGROUND OF THE INVENTION

A conventional continuously variable transmission, such as that disclosed in JPH8-178063A, in which a belt is looped around a primary pulley and a secondary pulley and a primary pulley pressure is controlled according to the operating position of a step motor, comprises storage means capable of storing a current operating position of the step motor, a speed ratio, and so on as pulley information. When a vehicle is activated, initialization of the step motor is performed on the basis of the stored pulley information, and after confirming the home position of the step motor, the step motor is displaced to an operating position corresponding to the stored speed ratio. Thus start control is performed from the speed ratio at the vehicle stopping time. The storage means typically comprise a backup power source so that the stored pulley information is retained even when the power source of the vehicle is OFF.

Further, when the primary pulley pressure does not rise to or above a predetermined pressure even after a predetermined period of time has elapsed following activation of the vehicle, control such as that disclosed in JP2004-125037A may be performed. In this control, it is determined that a deviation has occurred between the stored pulley information and the actual speed ratio, and while gradually displacing the step motor to an operating position corresponding to a High speed ratio, a determination is made as to whether or not the primary pulley pressure has increased. Thus, the vehicle can be started by setting the step motor to an appropriate operating position.

SUMMARY OF THE INVENTION

In a continuously variable transmission such as those described above, when power cannot be supplied to the storage means due to a defect or the like in the backup power source, it may become impossible to store the pulley information. Furthermore, when a defect or the like occurs in the backup power source after the pulley information has been stored, the pulley information may be lost (to be referred to hereafter as a backup failure).

In this state, when the vehicle stops before the speed ratio returns to the lowest speed ratio during an emergency stop or the like, the vehicle can be started from the speed ratio at the stopping time by gradually displacing the step motor to an operating position corresponding to a High speed ratio and detecting whether or not the primary pulley pressure has increased, as in Patent Document 2.

However, in a continuously variable transmission not provided with a primary pulley pressure sensor, it is impossible to determine whether or not the primary pulley pressure has increased, and therefore impossible to displace the step motor to a position in which the primary pulley pressure can be supplied relative to the speed ratio at the stopping time. As a result, the startability of the vehicle may be impeded.

This invention has been designed in order to solve these problems, and it is an object thereof to improve the startability of a vehicle having a continuously variable transmission not provided with a primary pulley pressure sensor by ensuring that a primary pulley pressure can be supplied reliably when the vehicle starts even if an operating position of a step motor at the preceding stopping time has not been stored.

The present invention provides a continuously variable transmission which comprises an input side primary pulley which varies a groove width according to a first oil pressure an output side secondary pulley which varies a groove width according to a second oil pressure a belt looped around the primary pulley and the secondary pulley, having a contact radius with the pulleys which varies in accordance with the groove width a speed change control mechanism constituted by a speed change link, one end portion of which is connected to a movable sheave of the primary pulley and another end portion of which is connected to a step motor, and a speed change control valve connected to a center of the speed change link, which controls the first oil pressure in accordance with an operating position of the step motor, and a controller. The controller stores a speed ratio at a stopping time of a vehicle shifts the operating position of the step motor to a home position during activation of the vehicle when the speed ratio at the stopping time of the vehicle cannot be stored when the speed ratio at the stopping time of the vehicle cannot be stored and the primary pulley and the secondary pulley do not rotate during activation of the vehicle, sets the first oil pressure to substantially zero, increases the second oil pressure to a predetermined oil pressure, and shifts a ratio between the contact radius with the primary pulley and the contact radius with the secondary pulley to a ratio corresponding to a lowest speed ratio.

According to this invention, when the speed ratio at the stopping time of the vehicle cannot be stored, a primary pulley pressure can be supplied reliably during the next start even without the use of a primary pulley pressure sensor, and thus the vehicle can be started from the lowest speed ratio, enabling an improvement in the startability of the vehicle.

The details as well as other features and advantages of this invention are set forth in the remainder of the specification and are shown in the accompanying drawings.

DETAILED DESCRIPTION OF THE PREFERRED EMBODIMENT

Figure 1:
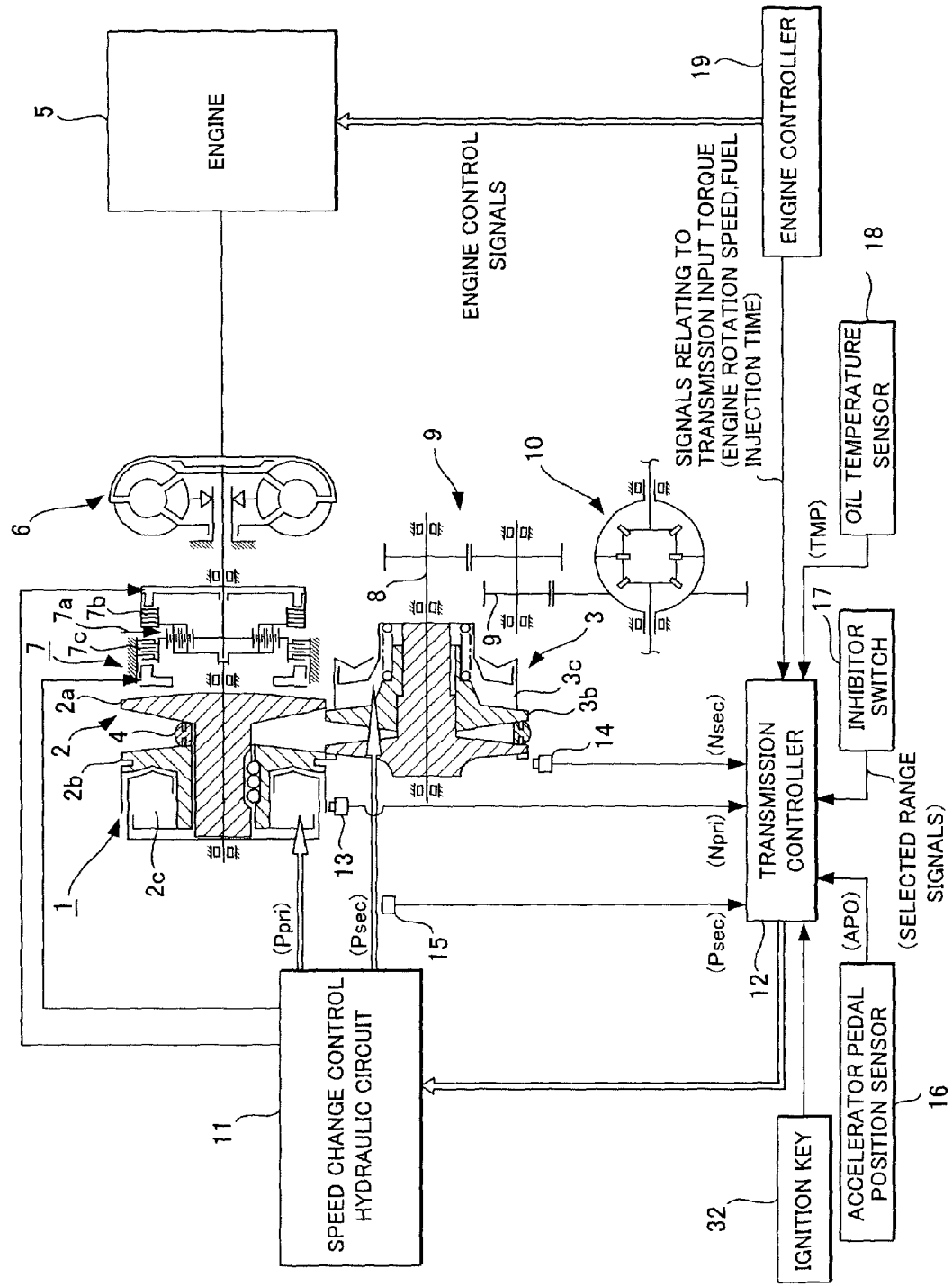
FIG. 1 is a schematic constitutional diagram of a continuously variable transmission according to an embodiment of this invention.

An embodiment of this invention will be described in detail below on the basis of the drawings. FIG. 1 shows an outline of a V-belt continuously variable transmission 1. The V-belt continuously variable transmission 1 comprises a primary pulley 2 and a secondary pulley 3 arranged such that the V-grooves of the two are aligned, and a V-belt (belt) 4 which is looped around the V-grooves of the pulleys 2, 3. An engine 5 is disposed coaxial with the primary pulley 2, and a torque converter 6 comprising a lockup clutch and a forward-reverse switching mechanism 7 are provided between the engine 5 and primary pulley 2 in succession from the engine 5 side.

The forward-reverse switching mechanism 7 comprises a double pinion planetary gear set 7a as a principal constitutional element, the sun gear thereof being joined to the engine 5 via the torque converter 6 and the carrier thereof being joined to the primary pulley 2. The forward-reverse switching mechanism 7 further comprises a forward clutch 7b which is directly coupled between the sun gear and carrier of the double pinion planetary gear set 7a, and a reverse brake 7c which fixes a ring gear. When the forward clutch 7b is engaged, an input rotation input from the engine 5 via the torque converter 6 is transmitted to the primary pulley 2 as is, and when the reverse brake 7c is engaged, the input rotation input from the engine 5 via the torque converter 6 is reversed and transmitted to the secondary pulley 2.

The rotation of the primary pulley 2 is transmitted to the secondary pulley 3 via the V-belt 4, and the rotation of the secondary pulley 3 is transmitted thereafter to a vehicle wheel, not shown in the drawing, via an output shaft 8, a gear set 9, and a differential gear device 10.

To make a rotation transmission ratio (speed ratio) between the primary pulley 2 and secondary pulley 3 variable during this power transmission, the sheaves forming the respective V-grooves of the primary pulley 2 and secondary pulley 3 are divided into fixed sheaves 2a, 3a, and movable sheaves 2b, 3b which are capable of axial displacement. The movable sheaves 2b, 3b are biased toward the fixed sheaves 2a, 3a through the supply of a primary pulley pressure (first oil pressure) (Ppri) and a secondary pulley pressure (second oil pressure) (Psec), which are generated using a line pressure as a source pressure, to a primary pulley chamber 2c and a secondary pulley chamber 3c. As a result, the V-belt 4 is caused to frictionally engage with the sheaves such that power transmission between the primary pulley 2 and secondary pulley 3 is performed.

During a speed change, the V-groove width of the two pulleys 2, 3 is varied by the differential pressure between the primary pulley pressure (Ppri) and secondary pulley pressure (Psec), which are generated in accordance with a target speed ratio (I (o)), and by continuously varying the looped arc diameter of the V-belt 4 relative to the pulleys 2, 3, an actual speed ratio (to be referred to here after speed ratio) (ip) is varied, and the target speed ratio (I (o)) is realized.

The primary pulley pressure (Ppri) and secondary pulley pressure (Psec) are controlled by a speed change control hydraulic circuit 11 together with the output of an engagement oil pressure of the forward clutch 7b, which is engaged when a forward traveling range is selected, and an engagement oil pressure of the reverse brake 7c, which is engaged when a reverse traveling range is selected. The speed change control hydraulic circuit 11 performs control in response to a signal from a transmission controller 12.

Signals from a primary pulley rotation sensor 13 which detects a primary pulley rotation speed (Npri), signals from a secondary pulley rotation sensor 14 which detects a secondary pulley rotation speed (Nsec), signals from a secondary pulley pressure sensor 15 which detects the secondary pulley pressure (Psec), signals from an accelerator opening sensor 16 which detects an accelerator pedal depression amount (APO), selected range signals from an inhibitor switch 17, signals from an oil temperature sensor 18 which detects a speed change hydraulic fluid temperature (TMP), signals (engine rotation speed and fuel injection time) relating to a transmission input torque (Ti) from an engine controller 19 which controls the engine 5, and signals relating to ON/OFF of an ignition key 32, are input into the transmission controller 12.

Figure 2:
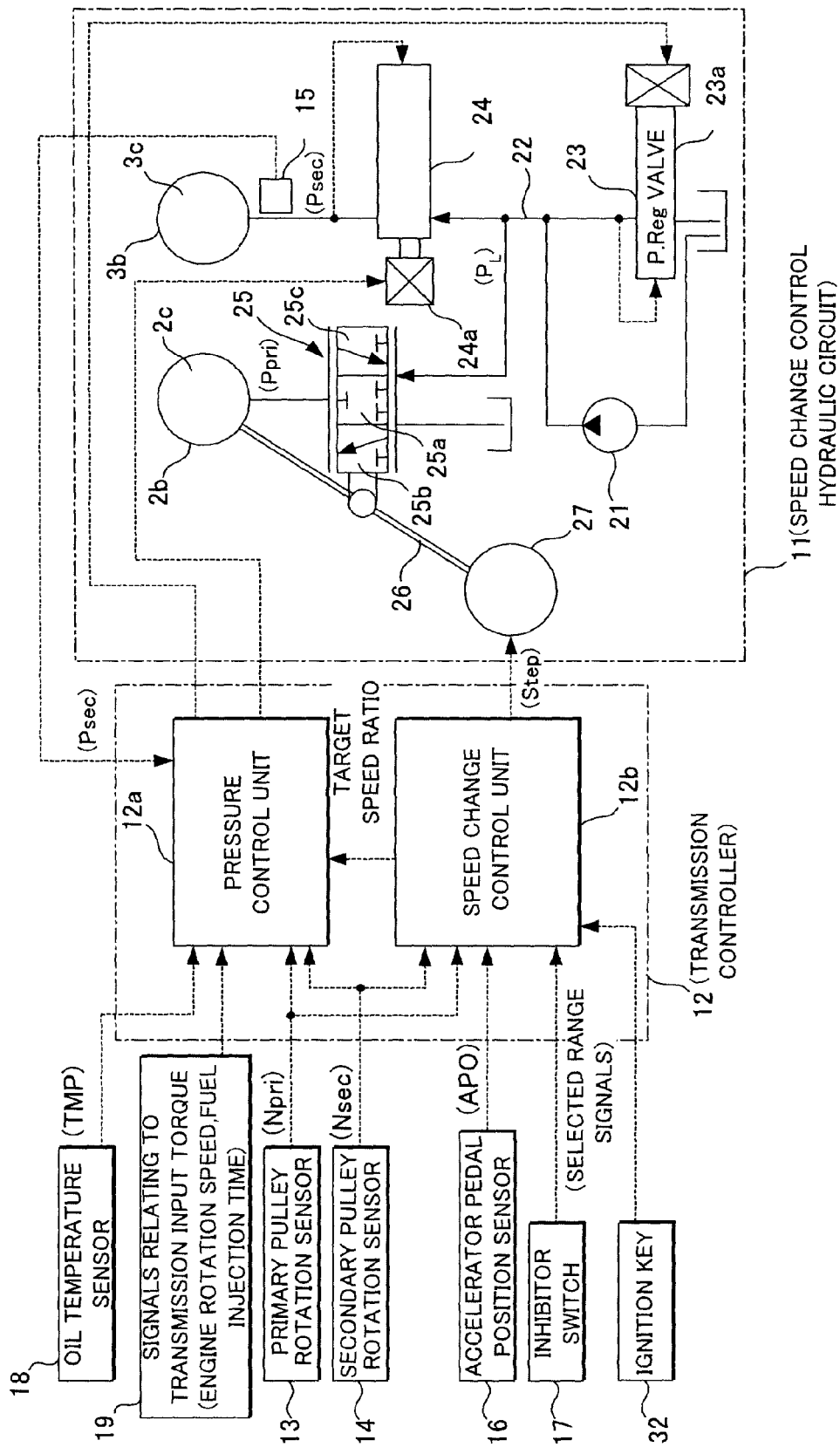
FIG. 2 is a schematic constitutional diagram of a speed change control hydraulic circuit and a transmission controller according to an embodiment of this invention.

Next, the speed change control hydraulic circuit 11 and transmission controller 12 will be described using the schematic diagram in FIG. 2. First, the speed change control hydraulic circuit 11 will be described.

The speed change control hydraulic circuit 11 comprises an engine-driven oil pump 21, and the pressure of a hydraulic fluid supplied to an oil passage 22 by the oil pump 21 is regulated to a predetermined line pressure (PL) by a pressure regulator valve 23. The pressure regulator valve 23 controls the line pressure (PL) in accordance with a drive duty input into a solenoid 23a.

The line pressure (PL) in the oil passage 22 is adjusted by a pressure reducing valve 24 and supplied to the secondary pulley chamber 3c as the secondary pulley pressure (Psec) on the one hand, and adjusted by a speed change control valve 25 and supplied to the primary pulley chamber 2c as the primary pulley pressure (Ppri) on the other hand. The pressure reducing valve 24 controls the secondary pulley pressure (Psec) in accordance with a drive duty input into a solenoid 24a.

The speed change control valve 25 comprises a neutral position 25a, a pressure increasing position 25b, and a pressure reducing position 25c, and to switch between these valve positions, the speed control valve 25 is connected to the middle of a speed change link 26. The speed change link 26 is connected to a step motor 27 serving as a speed change actuator at one end thereof, and to the movable sheave 2b of the primary pulley 2 at the other end thereof (The movable sheave 2b, the speed change link 26, and the control valve 25 constitute a speed change control mechanism).

The step motor 27 is set in an operating position which is advanced from a home position by a step count (Step) corresponding to the target speed ratio (I (o)), and through the operation of the step motor 27, the speed change link 26 swings using a connecting portion with the movable sheave 2b as a fulcrum. As a result, the speed change control valve 25 is moved from the neutral position 25a to the pressure increasing position 25b or the pressure reducing position 25c. Hence, the primary pulley pressure (Ppri) is increased using the line pressure (PL) as a source pressure or decreased through a drain, and thus the differential pressure between the primary pulley pressure (Ppri) and secondary pulley pressure (Psec) is varied so as to generate an upshift to a high side speed ratio or a downshift to a low side speed ratio. Accordingly, the speed ratio (ip) follows the target speed ratio (I (o)).

The speed change advancement is fed back to the corresponding end of the speed change link 26 via the movable sheave 2b of the primary pulley 2, and the speed change link 26 swings about a connecting portion with the step motor 27 in a direction which returns the speed change control valve 25 from the pressure increasing position 25b or the pressure reducing position 25c to the neutral position 25a. Hence, when the target speed ratio (I (o)) is reached, the speed change control valve 25 is returned to the neutral position 25a so that the target speed ratio (I (o)) can be maintained.

The solenoid drive duty of the pressure regulator valve 23, the solenoid drive duty of the pressure reducing valve 24, and a speed change command (step count) input into the step motor 27 are issued by the transmission controller 12. The transmission controller 12 also performs control to determine whether or not to supply the engagement oil pressure to the forward clutch 7b and reverse brake 7c shown in FIG. 1. The transmission controller 12 is constituted by a pressure control unit (line pressure control means) 12a and a speed change control unit 12b.

The pressure control unit 12a determines a solenoid drive duty of the pressure regulator valve 23 and a solenoid drive duty of the pressure reducing valve 24, and a speed change control unit 12b calculates an attained speed ratio (DsrRTO) and a target speed ratio (I (o)).

When the vehicle stops, the transmission controller (speed ratio storage means) 12 stores (as backup) the speed ratio (ip) immediately prior to the stopping time, and at the time of the next start, following initialization of the step motor 27, the operating position of the step motor 27 is set on the basis of the stored speed ratio (ip). Thus, the vehicle is started in a state where the position of the primary pulley 2 corresponds to the operating position of the step motor 27.

Figure 3:
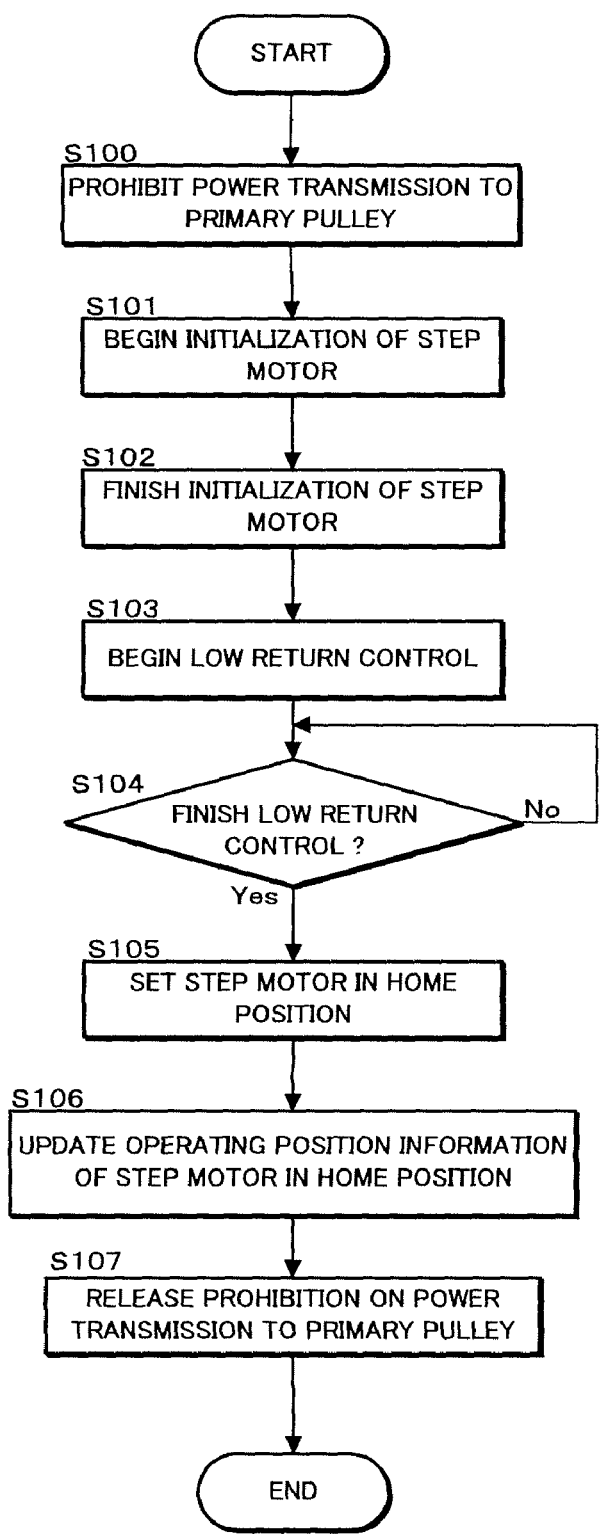
FIG. 3 is a flowchart illustrating activation control during a backup failure, according to this invention.

Next, activation control during a backup failure will be described using the flowchart in FIG. 3.

When the ignition key 32 is switched ON, power transmission from the engine 5 to the primary pulley 2 is prohibited in a step S100. Here, power transmission from the engine 5 to the primary pulley 2 is prevented by the forward-reverse switching mechanism 7.

In a step S101, initialization of the step motor 27 is begun. Here, the operating position of the step motor 27 is set at an operating position on a mechanically even lower side than a home position, in which the speed ratio (ip) is the lowest speed ratio, from an operating position in which the speed ratio (ip) is the highest speed ratio. In other words, it is assumed that the speed ratio (ip) is the highest speed ratio, and the operating position of the step motor 27 is shifted from the highest speed ratio to a position corresponding to the speed ratio (ip) that is on a mechanically even lower side than the lowest speed ratio. As a result, the operating position of the step motor 27 can be reliably set to a lower side than the lowest speed ratio. It should be noted that even at the lowest speed ratio, oil exists in the primary pulley oil chamber 2c, and by setting the operating position of the step motor 27 even lower than the primary pulley pressure (Ppri) at the lowest speed ratio, the speed ratio (ip) shifts to the mechanically low side. The lowest speed ratio is the largest gear ratio in the ratios which are used while moving. And the highest speed ratio is the smallest gear ratio in the ratios which are used while moving.

In a step S102, the operating position of the step motor 27 is set in the home position, whereupon initialization of the step motor 27 ends (the steps S101 and S102 constitute initialization means).

In a step S103, low return control is begun. Here, the operating position of the step motor 27 is set on a mechanically even lower side than the lowest speed ratio such that the primary pulley pressure (Ppri) is completely drained. Further, oil is supplied to the secondary pulley chamber 3c such that the secondary pulley pressure (Psec) is set at a predetermined pressure (P1). The predetermined pressure (P1) is a pressure at which the V-belt 4 reaches a strength limit.

Thus, even when the primary pulley 2 and secondary pulley 3 do not rotate, the movable sheaves 2b, 3b move such that in the primary pulley 2, the looped arc diameter of the V-belt 4 decreases, and in the secondary pulley 3, the looped arc diameter of the V-belt 4 increases. Hence, when the vehicle is stationary, the relative positions of the primary pulley 2 and secondary pulley 3 are varied such that the pulley ratio (speed ratio (ip)) of the primary pulley 2 and secondary pulley 3 shifts to the low side.

In a step S104, a determination is made as to whether or not a low return control termination condition has been satisfied. When the low return control termination condition is satisfied, the routine advances to a step S105.

The low return control termination condition is satisfied when the primary pulley pressure (Ppri) has been completely drained and the secondary pulley pressure (Psec) has been at the predetermined pressure (P1) continuously for a predetermined time period (T1). The predetermined time period (T1) is a time period in which the speed ratio (ip) invariably shifts to a mechanically even lower side than the lowest speed ratio when the speed ratio (ip) at the previous stopping time is the highest speed ratio, the primary pulley pressure (Ppri) has been completely drained, and the secondary pulley pressure (Psec) is at the predetermined pressure (P1). In other words, by performing low return control, the relative positions of the primary pulley 2 and the secondary pulley 3 can be set in positions where the speed ratio (ip) shifts to a mechanically even lower side than the lowest speed ratio, even when the primary pulley 2 and secondary pulley 3 do not rotate.

In the step S105, the operating position of the step motor 27 is set in the home position. The relative positions of the primary pulley 2 and the secondary pulley 3 are set further on the low side than positions in which the speed ratio (ip) is at the lowest speed ratio, and therefore, by setting the operating position of the step motor 27 in the home position, the speed change control valve 25 invariably shifts to the pressure increasing position 25b such that oil is reliably supplied to the primary pulley chamber 2c and the primary pulley pressure (Ppri) is supplied reliably. Further, the secondary pulley pressure (Psec) is set at a pressure corresponding to the lowest speed ratio (the steps S103 through S105 constitute pulley ratio control means).

In a step S106, the home position of the step motor 27 is updated to the position in which the speed ratio (ip) is at the lowest speed ratio. Thus, when the home position of the step motor 27 has not been at the lowest speed ratio, the home position of the step motor 27 and the position in which the speed ratio (ip) of the primary pulley 2 and secondary pulley 3 reaches the lowest speed ratio can be associated (the step S106 constitutes pulley ratio storage means). Accordingly, when a deviation occurs between the operating position of the step motor 27 and the speed ratio (ip), the deviation can be corrected.

In a step S107, the prohibition on power transmission from the engine 5 to the primary pulley 2 is released. Thus, the vehicle can start with the speed ratio (ip) at the lowest speed ratio.

By means of the control described above, during a backup failure, the operating position of the step motor 27 is set in the home position by performing initialization of the step motor 27, and the speed ratio (ip) is set at the lowest speed ratio. In so doing, the primary pulley pressure (Ppri) can be supplied reliably without using a primary pulley pressure sensor, and thus the vehicle can be started.

Figure 4:
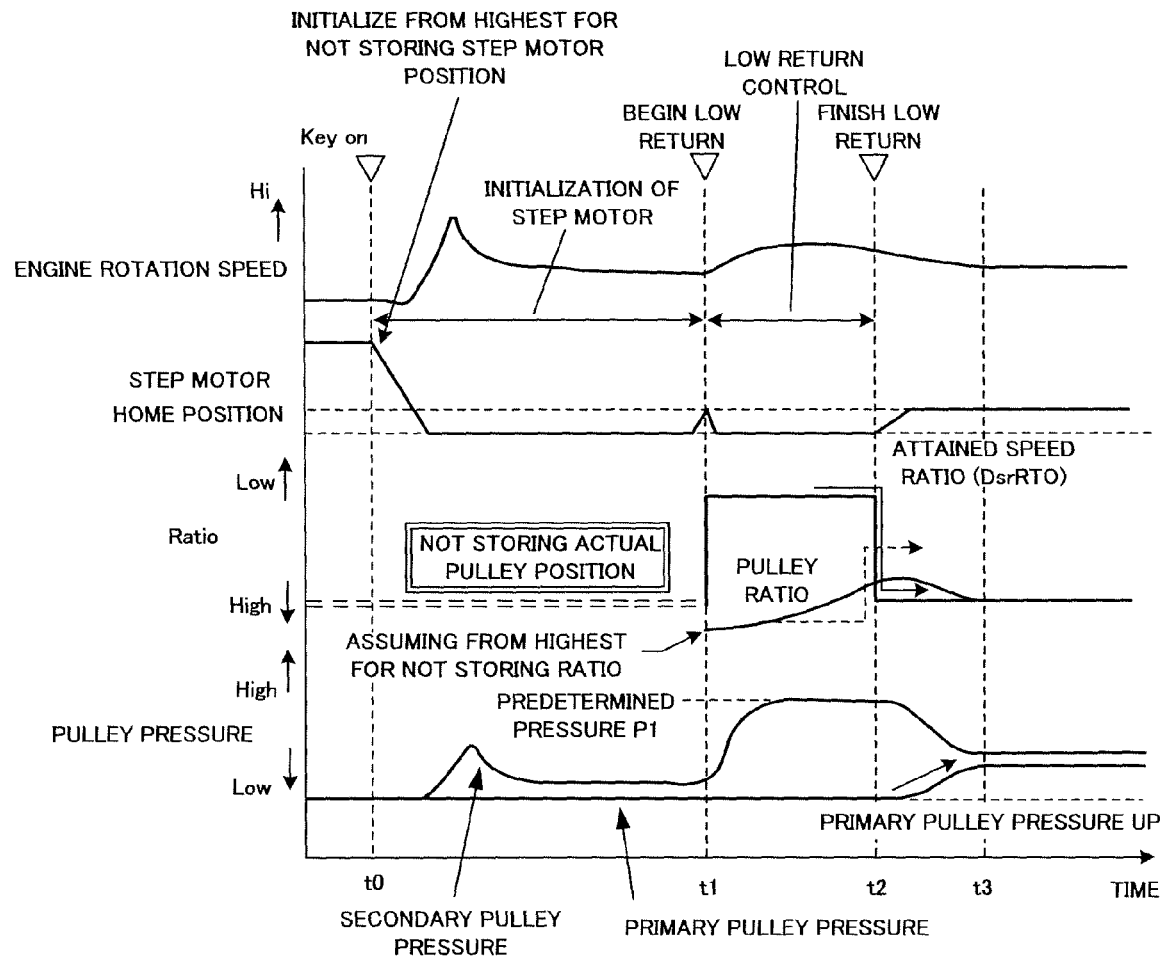
FIG. 4 is a time chart illustrating variation in the operating position of a step motor and so on during a backup failure, according to this invention.

Next, variation in the operating position of the step motor 27 and so on when activation control is performed during a backup failure will be described using the time chart in FIG. 4.

When the ignition key 32 is set in a position for supplying a current to the transmission controller 12 (an accessory position) at a time to, initialization of the step motor 27 is begun, and the operating position of the step motor 27 is set in a position on a mechanically even lower side than the home position at the lowest speed ratio.

Next, the ignition key 32 is shifted to a starting position to crank the engine 5, and following complete combustion, the ignition key 32 is returned to an ON position to set the engine 5 in a state of idle rotation. Due to the forward-reverse switching mechanism 7, however, the power of the engine 5 is not transmitted to the primary pulley 2.

When the engine 5 has been started (idle rotation) and initialization of the step motor 27 is complete at a time (t1), low return control is begun. Using the attained speed ratio (DsrRTO) as a value indicating an even lower side than the position at the lowest speed ratio, the operating position of the step motor 27 is set in a mechanically even lower position than the position in which the speed ratio (ip) is the lowest speed ratio, whereby the primary pulley pressure (Ppri) is drained completely. Further, the secondary pulley pressure (Psec) is set at the predetermined pressure (P1). As a result, the pulley ratio (speed ratio (ip)) of the primary pulley 2 and secondary pulley 3 is shifted to the low side.

When low return control finishes at a time (t2), the operating position of the step motor 27 is set in the home position. Further, the secondary pulley pressure (Psec) is shifted to a pressure at which the speed ratio (ip) reaches the lowest speed ratio. Thus, the operating position of the step motor shifts to the home position such that the primary pulley pressure (Ppri) can be supplied. The secondary pulley pressure (Psec) shifts to a lower pressure than the predetermined pressure (P1), and the speed ratio (ip) shifts to the lowest speed ratio.

At a time (t3), the home position of the step motor 27 is updated to the position in which the speed ratio (ip) reaches the lowest speed ratio.

It should be noted that this control may be used on a vehicle employing a starting clutch without the torque converter 6. When a starting clutch is employed, low return control can be performed quickly, which is desirable.

In this embodiment, low return control is performed after initialization of the step motor 27, but initialization of the step motor 27 and low return control may be performed simultaneously.

Further, the operating position of the step motor 27 may be set on the higher side than the position of the lowest speed ratio following low return control. In so doing, the primary pulley pressure (Ppri) can be supplied even more reliably, and the vehicle can be started even more reliably.

Furthermore, in cases such as when a shift lever is operated in a D range, for example, during low return control, the startability of the vehicle may take precedence such that low return control is canceled and the vehicle is started.

The effects of this embodiment of the invention will now be described.

In this embodiment, when the speed ratio at the stopping time of the vehicle cannot be stored, initialization of the step motor 27 is performed to set the operating position of the step motor 27 in the home position. Thus, the primary pulley pressure (Ppri) of the non-rotating primary pulley 2 is completely drained and the secondary pulley pressure (Psec) of the non-rotating secondary pulley 3 is raised to the predetermined pressure (P1), whereby the pulley ratio (speed ratio (ip)) of the primary pulley 2 and secondary pulley 3 is set at the lowest speed ratio. Hence, even when the speed ratio (ip) at the stopping time of the vehicle cannot be stored and the step motor 27 is set in the home position, the primary pulley pressure (Ppri) can be supplied reliably without using a primary pulley pressure sensor by setting the speed ratio (ip) at the lowest speed ratio, and thus the vehicle can be started. Furthermore, the vehicle can be started without causing slippage in the V-belt 4, for example.

The home position of the step motor 27 following initialization of the step motor 27 is stored as a position indicating the lowest speed ratio, and therefore, when a deviation occurs between the operating position of the step motor 27 and the speed ratio (ip), the deviation can be corrected.

Further, by shifting the speed ratio (ip) to a mechanically even lower side than the lowest speed ratio and then to the lowest speed ratio when the primary pulley pressure (Ppri) is substantially zero and the secondary pulley pressure (Psec) is at the predetermined pressure (P1), the speed change control valve 25 invariably shifts to the pressure increasing position 25b, and therefore the primary pulley pressure (Ppri) can be supplied reliably.

Furthermore, by assuming that the speed ratio (ip) at the stopping time is the highest speed ratio and then shifting the speed ratio (ip) to a mechanically even lower side than lowest speed ratio during low return control, the primary pulley pressure (Ppri) can be supplied reliably when the operating position of the step motor 27 has been set in the home position.

This application claims priority from Japanese Patent Application No. 2006-314092, filed Nov. 21, 2006, all of which is incorporated herein by reference in its entirety.

What is claimed is:

1. A continuously variable transmission without using a primary pulley pressure sensor comprising:
   an input side primary pulley which varies a groove width according to a first oil pressure;
   an output side secondary pulley which varies a groove width according to a second oil pressure;
   a belt looped around the primary pulley and the secondary pulley, having a contact radius for the primary pulley and a contact radius for the secondary pulley, the contact radius of the primary pulley and the contact radius of the secondary pulley varying in accordance with the groove width of the primary pulley and the groove width of the secondary pulley;
   a speed change control mechanism constituted by a speed change link, one end portion of which is connected to a movable sheave of the primary pulley and another end portion of which is connected to a step motor, and a speed change control valve connected to a center of the speed change link, which controls the first oil pressure in accordance with an operating position of the step motor, and
   a controller, which:
      stores a speed ratio at a stopping time of a vehicle;
      initializes the step motor, whereby the operation position of the step motor is shifted to a home position during activation of the vehicle when the speed ratio at the stopping time of the vehicle could not be stored;
      sets the first oil pressure to substantially zero, increases the second oil pressure to a predetermined oil pressure, and shifts a ratio between the contact radius with the primary pulley and the contact radius with the secondary pulley to a ratio corresponding to a lowest speed ratio, after the step motor is initialized and when the speed ratio at the stopping time of the vehicle could not be stored and the primary pulley and the secondary pulley do not rotate during activation of the vehicle; and
      stores a position of the primary pulley following shifting to the ratio corresponding to the lowest speed ratio as a position corresponding to the home position of the step motor.

2. The continuously variable transmission as defined in claim 1, wherein the controller shifts the ratio to a second ratio on an even lower side than the ratio corresponding to the lowest speed ratio, and then shifts the second ratio to the ratio corresponding to the lowest speed ratio.

3. The continuously variable transmission as defined in claim 1, wherein the controller shifts the ratio assuming that the speed ratio at the stopping time of the vehicle is a highest speed ratio.

4. A control method for a continuously variable transmission without using a primary pulley pressure sensor, the transmission comprising:

an input side primary pulley which varies a groove width according to a first oil pressure;

an output side secondary pulley which varies a groove width according to a second oil pressure;

a belt looped around the primary pulley and the secondary pulley, having a contact radius for the primary pulley and a contact radius for the secondary pulley, the contact radius of the primary pulley and the contact radius of the secondary pulley varying in accordance with the groove width of the primary pulley and the groove width of the secondary pulley; and a speed change control mechanism constituted by a speed change link, one end portion of which is connected to a movable sheave of the primary pulley and another end portion of which is connected to a step motor, and speed change control valve connected to a center of the speed change link, which controls the first oil pressure in accordance with an operating position of the step motor; and the method comprising:

storing a speed ratio at a stopping time of a vehicle;

initializing the step motor, whereby the operation position of the step motor is shifted to a home position during activation of the vehicle when the speed ratio at the stopping time of the vehicle cannot be stored;

setting the first oil pressure to substantially zero, increasing the second oil pressure to a predetermined oil pressure, and shifting a ratio between the contact radius with the primary pulley and the contact radius with the secondary pulley to a ratio corresponding to a lowest speed ratio, after initializing the step motor and when the speed ratio at the stopping time of the vehicle could not be stored and the primary pulley and the secondary pulley do not rotate during activation of the vehicle; and storing a position of the primary pulley following shifting to the ratio corresponding to the lowest speed ratio as a position corresponding to the home position of the step motor.

5. The control method for a continuously variable transmission as defined in claim 4, wherein the shifting the ratio shifts the ratio to a second ratio on an even lower side than the ratio corresponding to the lowest speed ratio, and then shifts the second ratio to the ratio corresponding to the lowest speed ratio.

6. The control method for a continuously variable transmission as defined in claim 4, wherein the shifting the ratio shifts the ratio assuming that the speed ratio at the stopping time of the vehicle is a highest speed ratio.

* * * * *